United States Patent
Saito et al.

(10) Patent No.: US 9,804,042 B2
(45) Date of Patent: Oct. 31, 2017

(54) LOAD SENSOR AND LOAD DETECTING DEVICE

(71) Applicant: ALPS ELECTRIC CO., LTD., Ota-ku, Tokyo (JP)

(72) Inventors: Mitsuru Saito, Tokyo (JP); Mikio Sekine, Tokyo (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/040,122

(22) Filed: Feb. 10, 2016

(65) Prior Publication Data

US 2016/0265988 A1 Sep. 15, 2016

(30) Foreign Application Priority Data

Mar. 11, 2015 (JP) ................. 2015-048146

(51) Int. Cl.
*G01L 1/22* (2006.01)
*B60N 2/00* (2006.01)
*B60R 21/015* (2006.01)

(52) U.S. Cl.
CPC ............ *G01L 1/2206* (2013.01); *B60N 2/002* (2013.01); *G01L 1/2262* (2013.01); *B60R 21/0152* (2014.10)

(58) Field of Classification Search
CPC .. G01L 1/2206; G01L 1/2262; B60R 21/0152
USPC ....... 73/862.041–862.046, 862.381, 862.391
See application file for complete search history.

(56) References Cited

U.S. PATENT DOCUMENTS

| | | | | |
|---|---|---|---|---|
| 4,299,130 A | * | 11/1981 | Koneval | G01B 7/20 338/2 |
| 6,546,822 B1 | * | 4/2003 | Tahara | B60N 2/002 73/862.41 |
| 7,055,365 B2 | | 6/2006 | Yanagi | |
| 7,555,960 B2 | * | 7/2009 | Nakano | B60N 2/002 73/781 |
| 2004/0035224 A1 | | 2/2004 | Kajiyama et al. | |
| 2009/0107258 A1 | * | 4/2009 | Saitoh | B60N 2/002 73/862.046 |
| 2011/0219883 A1 | * | 9/2011 | McMillan | G01B 7/20 73/767 |
| 2011/0283804 A1 | * | 11/2011 | Jost | G01L 1/2206 73/774 |
| 2014/0165744 A1 | * | 6/2014 | Lull | A63B 24/0087 73/862.338 |

* cited by examiner

*Primary Examiner* — Max Noori
(74) *Attorney, Agent, or Firm* — Hunton & Williams LLP

(57) ABSTRACT

A load sensor is provided with a seat mounting hole between both end parts of a rectangular plate-like main body portion of a load receiving member. A plurality of strain detecting elements the resistance value of each of which changes depending on the amount of strain of the main body portion are disposed around the seat mounting hole. In plan view of the load receiving member, the center point of the seat mounting hole is offset from the center point of the arrangement of the plurality of strain detecting elements toward a part of the load receiving member that has relatively high rigidity.

12 Claims, 10 Drawing Sheets

LOAD SENSOR AND LOAD DETECTING DEVICE

CLAIM OF PRIORITY

This application contains subject matter related to and claims the benefit of Japanese Patent Application No. 2015-048146 filed on Mar. 11, 2015, the entire contents of which is incorporated herein by reference.

BACKGROUND OF THE DISCLOSURE

1. Field of the Disclosure

The present disclosure relates to a load sensor and a load detecting device having this load sensor.

2. Description of the Related Art

A load sensor is incorporated, for example, in an automotive seat, and is used for detecting the presence or absence of an occupant in the seat and the weight of the occupant.

Examples of such load sensors include a load sensor disclosed in Japanese Unexamined Patent Application Publication No. 2004-205489, which has a flat plate-like strain member and a strain sensor that detects the strain of the strain member.

In such a load sensor, the load value detected when a load in the direction of gravitational force is applied to a load receiving member from a position offset in a horizontal direction (offset load value) may change with respect to the load value detected when a load in the direction of gravitational force is applied from just above the load receiving member (reference load value). The rate of change of the offset load value with respect to the reference load value is referred to as the "offset load characteristic." Due to the shape asymmetry of the load receiving member, the characteristic asymmetry of electric elements forming the strain sensor, and the like, the offset load characteristic may vary depending on the direction in which the load applying position is offset.

These and other drawbacks exist.

SUMMARY OF THE DISCLOSURE

Embodiments of the present disclosure solve the above problem of the conventional art, and provide a load sensor having little variation in offset load characteristic, and a load detecting device having this load sensor.

In an example embodiment, a load sensor includes a plate-like load receiving member having a pair of supporting portions and a load receiving portion provided between the pair of supporting portions, and a plurality of strain detecting elements disposed around the load receiving portion. The resistance value of each of the plurality of strain detecting elements changes depending on the amount of strain of the load receiving member. In plan view of the load receiving member, the center point of the load receiving portion is offset from the center point of the arrangement of the plurality of strain detecting elements toward a part of the load receiving member that has relatively high rigidity.

In a configuration in which, in plan view of the load receiving member, the center point of the seat mounting hole coincides with the center point of the main body portion, the offset load characteristic in a direction passing through a part of the load receiving member that has relatively high rigidity is small. In such an embodiment, in plan view of the load receiving member, the center point of the load receiving portion is offset from the center point of the arrangement of the plurality of strain detecting elements toward a part of the load receiving member that has relatively high rigidity, the balance of rigidity around the load receiving portion is thereby improved, and the offset load characteristic in a direction toward the part having relatively high rigidity can be made relatively small. Therefore, the variation in offset load characteristic can be suppressed.

The load receiving member may be formed in a substantially T-shape in plan view, the substantially T-shape having a rectangular plate-like main body portion and a protruding portion protruding from the middle of a long side of the main body portion in a direction perpendicular to the long side, the pair of supporting portions be provided in both longitudinal end parts of the main body portion, and in plan view of the load receiving member, the center point of the load receiving portion be offset from the center point of the arrangement of the plurality of strain detecting elements toward the protruding portion. The reason is that, in the plate-like load receiving member formed in a substantially T-shape in plan view, the rigidity of a part of the main body portion thereof that is near the protruding portion is higher.

In an example embodiment, a load sensor includes a plate-like load receiving member having a pair of supporting portions and a load receiving portion provided between the pair of supporting portions, and a plurality of strain detecting elements disposed around the load receiving portion, the resistance value of each of the plurality of strain detecting elements changing depending on the amount of strain of the load receiving member. The plurality of strain detecting elements form four resistance units, and a first circuit part in which two of the four resistance units are connected in series and a second circuit part in which the other two of the four resistance units are connected in series are connected in parallel to form a Wheatstone bridge circuit. The first circuit part is disposed between one of the pair of supporting portions and the load receiving portion. The second circuit part is disposed between the other of the pair of supporting portions and the load receiving portion. In a state where no load is applied to the load receiving member, the ratio of the resistance value of the positive-side resistance unit to the resistance value of the negative-side resistance unit in the first circuit part is set smaller than the ratio of the resistance value of the positive-side resistance unit to the resistance value of the negative-side resistance unit in the second circuit part. In plan view of the load receiving member, the center point of the load receiving portion is offset from the center point of the arrangement of the plurality of strain detecting elements toward the second circuit part.

In a configuration in which, in plan view of the load receiving member, the center point of the load receiving portion coincides with the center point of the arrangement of the plurality of strain detecting elements, when a Wheatstone bridge circuit is disposed on the load receiving member, the variation in offset load characteristic may be large depending on the asymmetry of electrical characteristic of the circuit. Specifically, when the ratio of the resistance value of the positive-side resistance unit to the resistance value of the negative-side resistance unit in the first circuit part of the Wheatstone bridge circuit is set smaller than the ratio of the resistance value of the positive-side resistance unit to the resistance value of the negative-side resistance unit in the second circuit part of the Wheatstone bridge circuit, due to the difference in sensitivity to strain between the first circuit part and the second circuit part, the offset load characteristic in a direction toward the second circuit part is relatively large. In an example embodiment, in plan view of the load receiving member, the center point of the load receiving portion is offset from the center point of the arrangement of the plurality of strain detecting elements toward the second circuit part, the balance of sensitivity to strain of each of the circuit parts is thereby improved, and the offset load characteristic in a direction toward the second circuit part can be made relatively small. Therefore, the variation in offset load characteristic can be suppressed.

In plan view of the load receiving member, the center point of the load receiving portion also may be offset from the center point of the arrangement of the plurality of strain detecting elements toward a part of the load receiving member that has relatively high rigidity. By offsetting the center point of the load receiving portion from the center point of the arrangement of the plurality of strain detecting elements toward a part of the load receiving member that has relatively high rigidity, the balance of rigidity around the load receiving portion is improved, and the offset load characteristic in a direction toward that part can be decreased. Therefore, the variation in offset load characteristic can be further suppressed.

In the above load sensor, the plurality of strain detecting elements may be disposed symmetrically with respect to a line passing through the center point of the arrangement and parallel to a direction in which the pair of supporting portions are opposed to each other.

In the above load sensor, the plurality of strain detecting elements may be disposed symmetrically with respect to a line passing through the center point of the arrangement and perpendicular to a direction in which the pair of supporting portions are opposed to each other.

In an example embodiment, a load detecting device may include the load sensor according to the present disclosure and a load detecting portion that detects the load applied to the load receiving member based on the output of the load sensor.

DETAILED DESCRIPTION OF THE DISCLOSURE

The following description is intended to convey a thorough understanding of the embodiments described by providing a number of specific embodiments and details involving a load sensor. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

A load detecting device according to an example embodiment of the present disclosure will be described with reference to FIGS. 1 to 6B.

Figure 1:
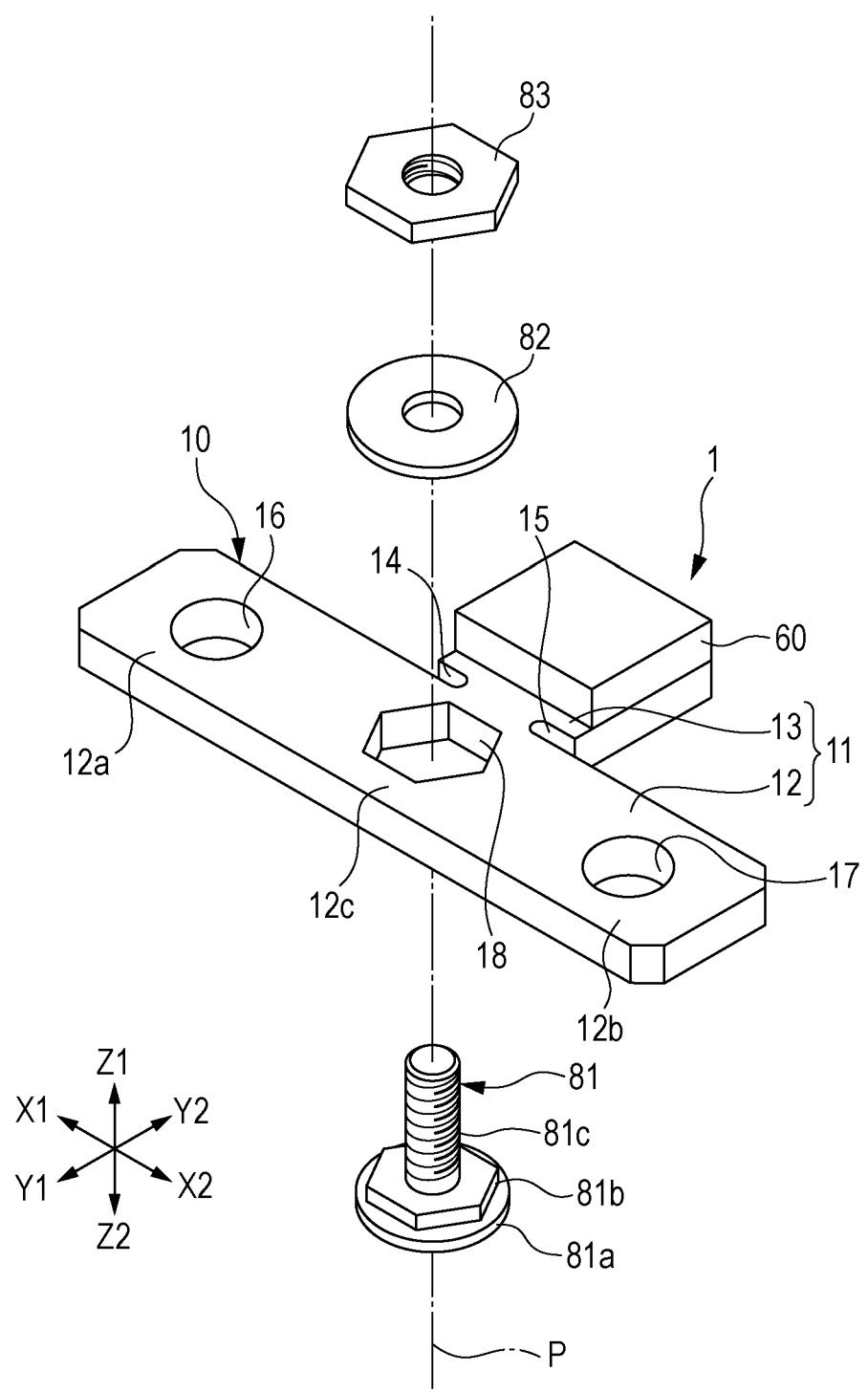
FIG. 1 is a perspective view of a load detecting device according to an example embodiment of the present disclosure.
Figure 2A:
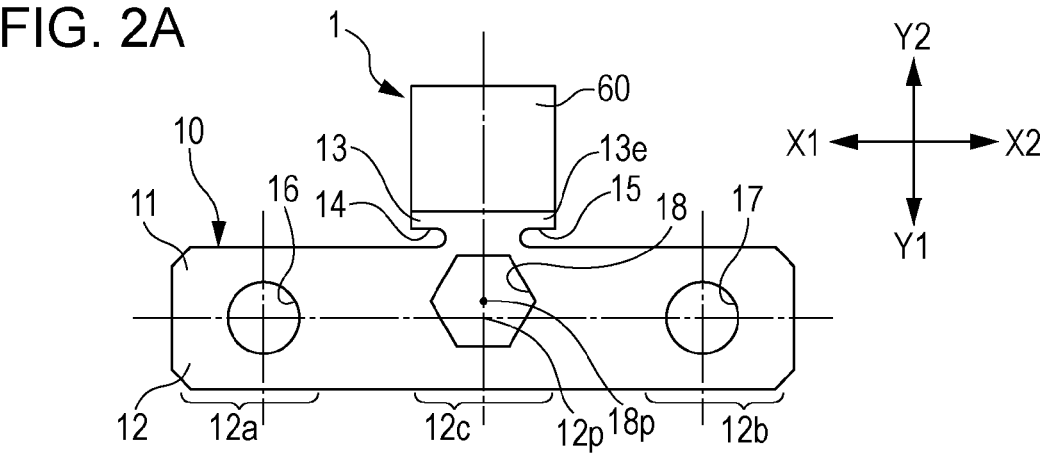
FIGS. 2A to 2C illustrate the configuration of the load detecting device of FIG. 1.
Figure 2B:
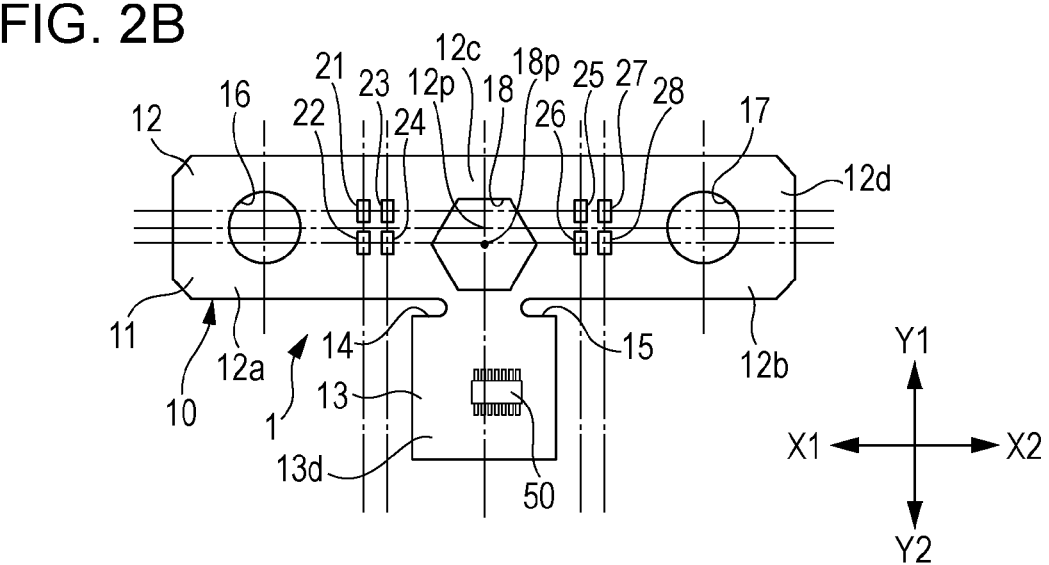
Figure 2C:
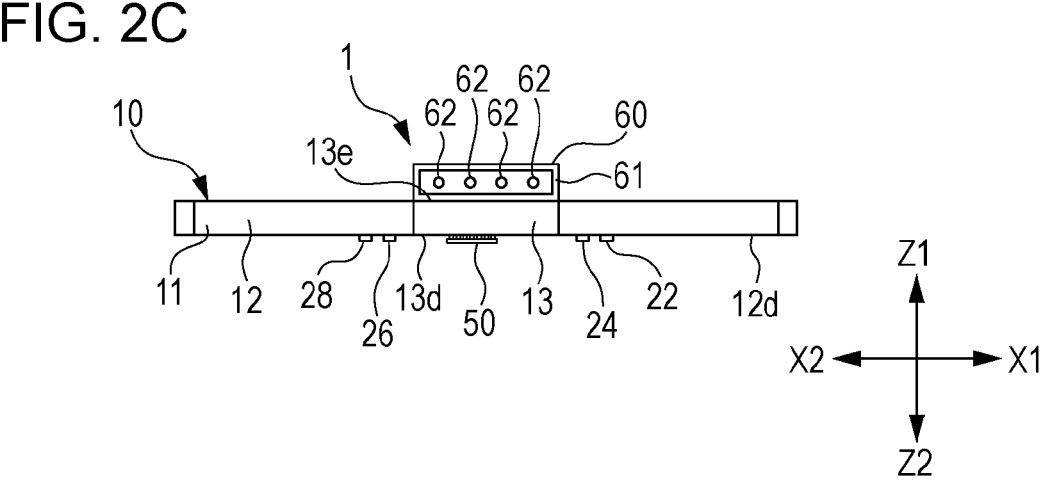
Figure 3:
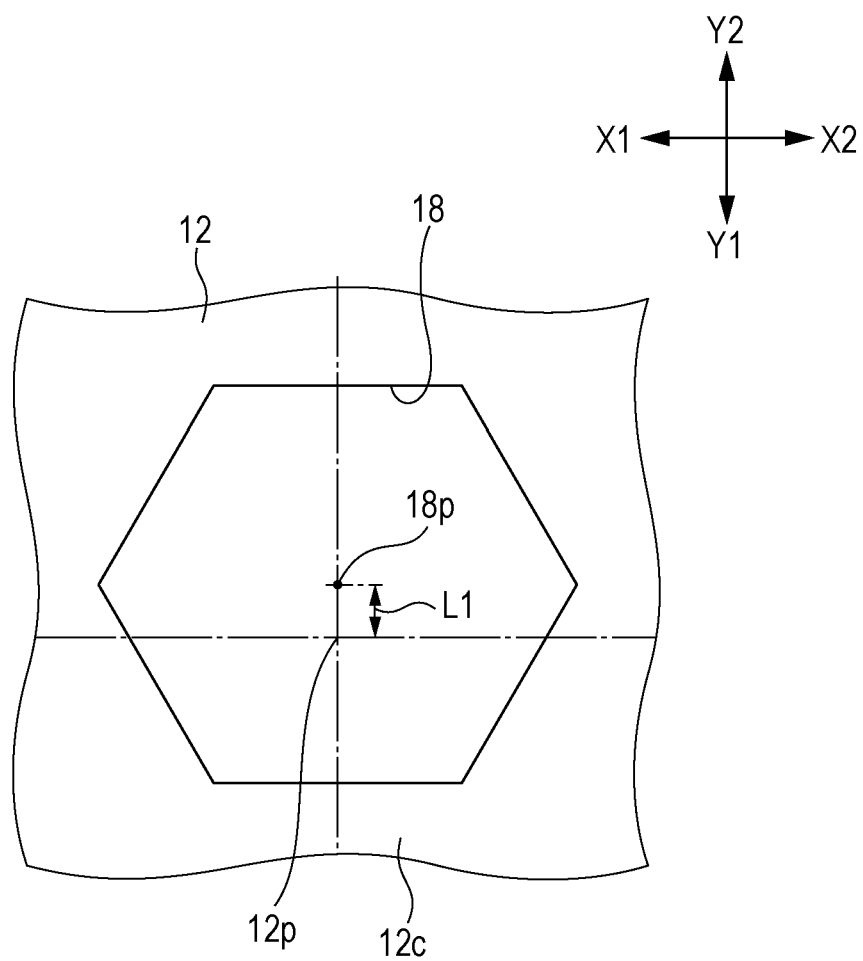
FIG. 3 is an enlarged plan view illustrating the offset of a seat mounting hole provided in a load sensor of the load detecting device of FIG. 2.
Figure 4:
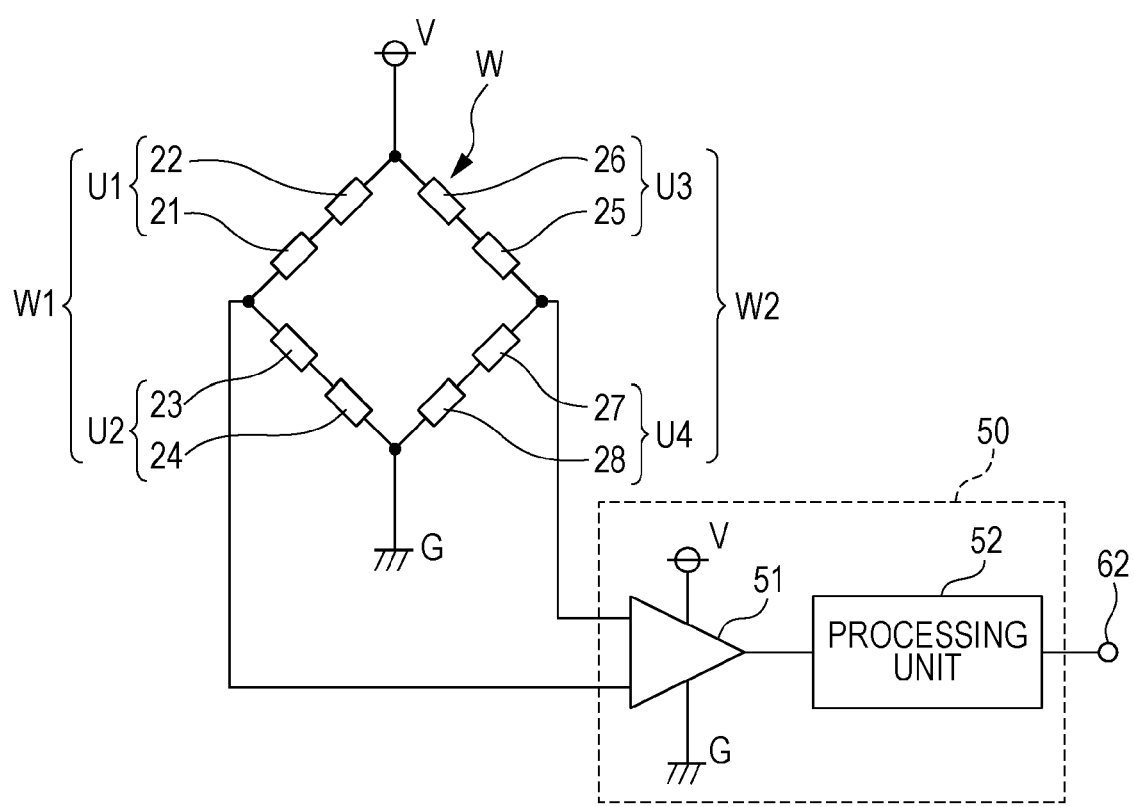
FIG. 4 illustrates the circuit configuration of the load sensor of the load detecting device of FIG. 2.
Figure 5A:
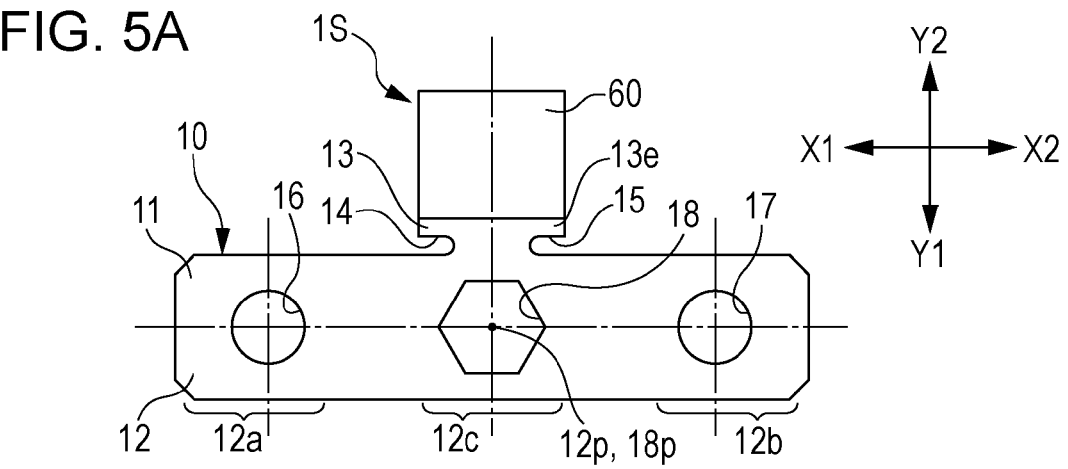
FIGS. 5A to 5C illustrate the configuration of a load detecting device having a load sensor provided with a seat mounting hole that is not offset.
Figure 5B:
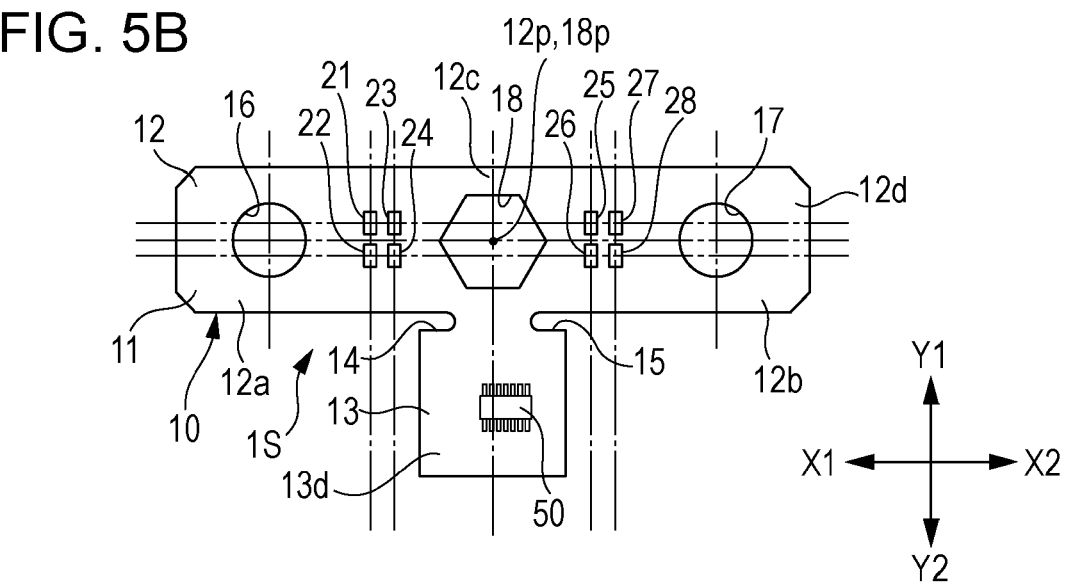
Figure 5C:
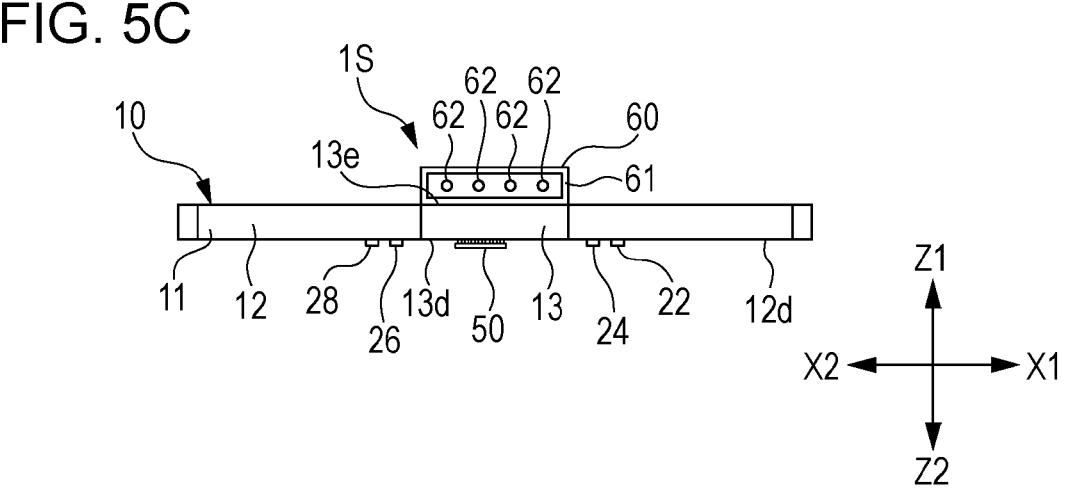
Figure 6A:
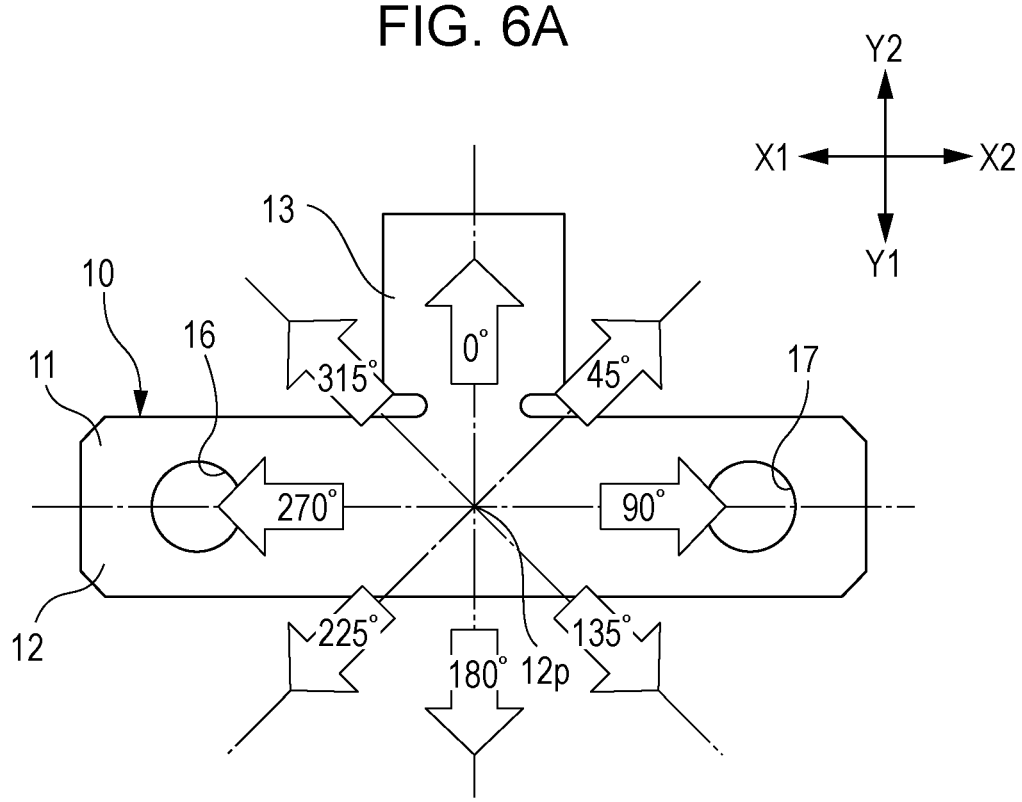
FIGS. 6A and 6B illustrate the offset load characteristic of the load detecting device of FIG. 1.
Figure 6B:
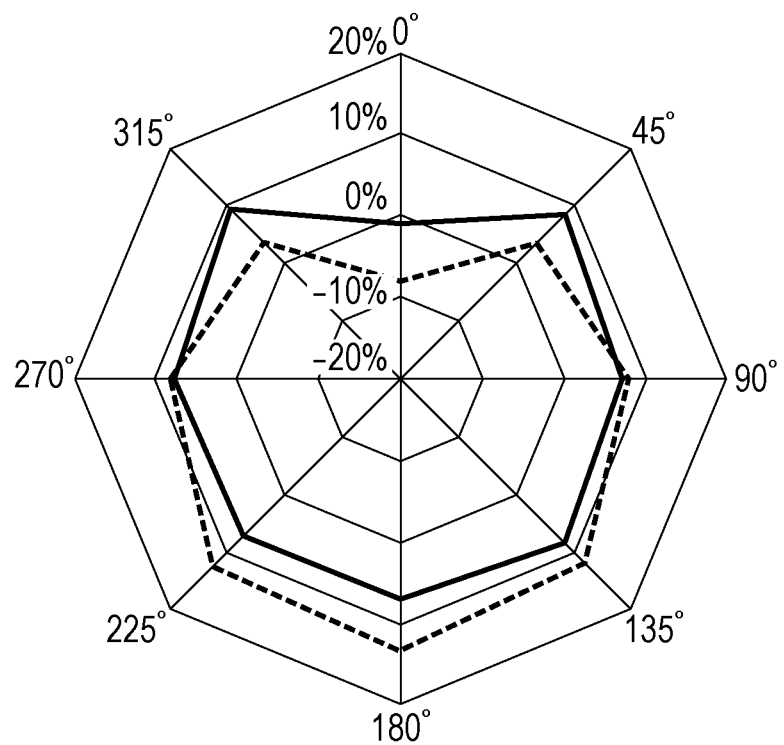

FIG. 1 is a perspective view of the load detecting device according to an example embodiment of the present disclosure. FIGS. 2A to 2C illustrate the configuration of the load detecting device of FIG. 1. FIG. 2A is a plan view, FIG. 2B is a bottom view, and FIG. 3C is a back view. FIG. 3 is an enlarged plan view illustrating the offset of a seat mounting hole provided in a load sensor of the load detecting device of FIG. 2. FIG. 4 illustrates the circuit configuration of the load sensor of the load detecting device of FIG. 2. FIGS. 5A to 5C illustrate the configuration of a load detecting device having a load sensor provided with a seat mounting hole that is not offset. FIGS. 6A and 6B illustrate the offset load characteristic of the load detecting device of FIG. 1. FIG. 6A is a plan view illustrating the directions of the offset load. FIG. 6B is a graph showing an example of the offset load characteristic in each direction of the offset load.

In each figure, the X1-X2 direction and the Y1-Y2 direction show two directions perpendicular to each other in a plane, and the Z1-Z2 direction shows a direction perpendicular to the plane. The plane containing the X1-X2 direction and the Y1-Y2 direction is a horizontal plane, and the Z1-Z2 direction is a vertical direction.

The load detecting device 1 in this embodiment may be provided between a seat of an automobile and a slide body slidably provided on a slide rail extending in the front-back direction of the automobile, and may be used for detecting the presence or absence of an occupant in the seat and the weight of the occupant. Of course, the load detecting device 1 may be used other than in an automobile.

As shown in FIGS. 1 to 2C, the load detecting device 1 may have a load sensor 10, a load detecting portion 50, and a connector 60.

The load sensor 10 may have a load receiving member 11 and a plurality of strain detecting elements 21 to 28.

The load receiving member 11 may have a main body portion 12 that may be formed in a substantially rectangular plate-like shape, and a substantially rectangular protruding portion 13 that may be formed so as to protrude in the Y2 direction from the middle of one of a pair of long sides of the main body portion 12 that are opposed to each other in the width direction of the main body portion 12 (Y1-Y2 direction). The main body portion 12 and the protruding portion 13 may be integral with each other. A notch 14 cut in the X2 direction and a notch 15 cut in the X1 direction may be provided at the junction of the main body portion 12 and the protruding portion 13. The notches 14 and 15 mitigate the effect of the connection of the protruding portion 13 to the main body portion 12 on the rigidity of the main body portion 12. The load receiving member 11 may be formed in a substantially T-shape in a plane containing the X1-X2 direction and the Y1-Y2 direction. The load receiving member 11 may have a uniform thickness.

The main body portion 12 may be provided with a pair of slide body mounting holes 16 and 17 in both longitudinal (X1-X2 direction) end parts 12a and 12b thereof. Fastening members (not shown), such as bolts, for fastening the load detecting device 1 to the slide body may be inserted into the pair of slide body mounting holes 16 and 17. The pair of slide body mounting holes 16 and 17 extend through the main body portion 12 in its thickness direction (Z1-Z2 direction), and are formed in a circular shape in plan view. Both longitudinal end parts 12*a* and 12*b* of the main body portion 12 correspond to a pair of supporting portions.

A seat mounting hole 18 into which a mounting bolt 81 for mounting the seat is inserted may be provided in a longitudinally middle part 12*c* of the main body portion 12. The seat mounting hole 18 may extend through the main body portion 12 in its thickness direction, and may be formed in a regular hexagonal shape in plan view.

As shown in FIG. 1, the mounting bolt 81 may include a disk-shaped head portion 81*a*, a hexagonal plate-shaped rotation-locking portion 81*b* superimposed on the head portion 81*a*, and a cylindrical externally threaded portion 81*c* protruding from the rotation-locking portion 81*b*, which may be coaxial and integral with each other. The rotation-locking portion 81*b* may be formed so as to be fittable into the seat mounting hole 18.

The externally threaded portion 81*c* of the mounting bolt 81 may be inserted into the seat mounting hole 18, and the rotation-locking portion 81*b* of the mounting bolt 81 is fitted into the seat mounting hole 18. A mounting nut 83 may be screwed on the externally threaded portion 81*c* of the mounting bolt 81 with a washer 82 interposed between the mounting nut 83 and the main body portion 12. At this time, the mounting bolt 81 may be disposed such that the axis P of the mounting bolt 81 passes through the center point 18*p* of the seat mounting hole 18. The seat may be mounted on the externally threaded portion 81*c* of the mounting bolt 81, and the load of the seat may be applied to the main body portion 12 centered around the center point 18*p* of the seat mounting hole 18. The seat mounting hole 18 and its peripheral edge in the middle part 12*c* of the main body portion 12 corresponds to a load receiving portion.

As shown in FIGS. 2A to 3, the seat mounting hole 18 may be formed such that its center point 18*p* is offset from the center point 12*p* (the center in both the longitudinal direction and the width direction) of the main body portion 12 toward the protruding portion 13 (in the Y2 direction) by a distance L1. In FIGS. 2A to 2C, the offset of the center point 18*p* of the seat mounting hole 18 may be exaggerated. The load receiving member 11 may have a base material of stainless steel. By screen-printing glass paste on the surface of the base material and firing it, a glass insulating layer (not shown) may be formed. By printing a paste-like silver material on the surface of the insulating layer and firing it, a plurality of strain detecting elements 21 to 28 and a wiring pattern (not shown) for electrically connecting the load detecting portion 50 and the connector 60 are formed on the load receiving member 11. Of course, the load receiving member 11 may have any configuration (material, shape, and the like) other than that described above without departing from the spirit of the present invention.

The plurality of strain detecting elements 21 to 28 (hereinafter simply referred to as "elements") may be provided on the bottom surface 12*d* (the surface facing in the Z2 direction) of the main body portion 12 of the load receiving member 11, and may be disposed around the seat mounting hole 18. The elements 21 to 28 may be configured such that the resistance value changes depending on the amount of strain of the main body portion 12. In this embodiment, by screen-printing a paste-like cermet material made from metal powder such as ruthenium oxide, glass-based powder, and the like and firing it, the plurality of strain detecting elements 21 to 28 are formed. Of course, the plurality of strain detecting elements 21 to 28 may have any other configuration.

The elements 21 to 28 may be formed such that they have equal electrical characteristics in response to strain. In other words, the elements 21 to 28 may be set such that when no load is applied to the main body portion 12, the resistance values R1 to R8 of the elements 21 to 28 are equal to each other, and the elements 21 to 28 are equal in the amount of change in resistance value with respect to the amount of strain of the main body portion 12.

As shown in FIG. 4, the elements 21 to 28 forms a Wheatstone bridge circuit W.

The plurality of elements 21 to 28 may be divided into pairs, which form four resistance units U1 to U4. Specifically, the elements 21 and 22 form a resistance unit U1, the elements 23 and 24 form a resistance unit U2, the elements 25 and 26 form a resistance unit U3, and the elements 27 and 28 form a resistance unit U4.

The two elements 21 and 22 forming the resistance unit U1 may be disposed such that when an offset load in a direction in which the elements 21 and 22 are arranged is applied to the load receiving member 11, the element 22 detects contracting strain when the element 21 detects elongating strain, the element 22 detects elongating strain when the element 21 detects contracting strain, and the effect of the offset load is thereby reduced. The same applies to the resistance units U2 to U4. In this embodiment, the resistance units U1 and U2 may be arranged in two rows and two columns. However, the arrangement of the resistance units U1 and U2 is not limited to this, and the resistance units U1 and U2 may be arranged in any other manner. The same applies to the resistance units U3 and U4.

The resistance unit U1 and the resistance unit U2 may be connected in series between a supply terminal V and a ground terminal G, and form a first circuit part W1 of the Wheatstone bridge circuit W. The first circuit part W1 may be disposed on the bottom surface 12*d* of the main body portion 12 between the slide body mounting hole 16 and the seat mounting hole 18.

The elements 21, 22, 23, and 24 forming the first circuit part W1 may be arranged at the four corners of a rectangle. The elements 21 and 22 are arranged spaced apart from each other in the width direction of the main body portion 12 and may be disposed nearer to the slide body mounting hole 16. The elements 23 and 24 are arranged spaced apart from each other in the width direction of the main body portion 12 and may be disposed nearer to the seat mounting hole 18.

The resistance unit U3 and the resistance unit U4 may be connected in series between a supply terminal V and a ground terminal G, and form a second circuit part W2 of the Wheatstone bridge circuit W. The second circuit part W2 may be disposed on the bottom surface 12*d* of the main body portion 12 between the slide body mounting hole 17 and the seat mounting hole 18.

The elements 25, 26, 27, and 28 forming the second circuit part W2 may be arranged at the four corners of a rectangle. The elements 25 and 26 may be arranged spaced apart from each other in the width direction of the main body portion 12 and are disposed nearer to the seat mounting hole 18. The elements 27 and 28 may be arranged spaced apart from each other in the width direction of the main body portion 12 and are disposed nearer to the slide body mounting hole 17.

In this embodiment, the elements 21 to 28 may be disposed symmetrically with respect to a line that passes through the center point 12*p* of the main body portion 12 and may be parallel to the longitudinal direction of the main body portion 12, and are disposed symmetrically with respect to a line that passes through the center point 12*p* of the main body portion 12 and is parallel to the width direction of the main body portion 12. The center point 12*p* of the main body portion 12 coincides with the center point of the arrangement of the elements 21 to 28 (the point where the total of the distances to the elements 21 to 28 is the smallest). The center point of the arrangement of the elements 21 to 28 may be offset from the center point 12*p* of the main body portion 12.

The load detecting portion 50 may be a microcomputer for embedded devices, and may be connected to the above-described strain detecting elements 21 to 28 and other electric components such as resistors and capacitors. The load detecting portion 50 may be disposed on the lower surface 13*d* of the protruding portion 13.

The load detecting portion 50 may have a comparator 51 and a processing unit 52 that obtains a digital value corresponding to an analog voltage output of the comparator 51 and transmits this digital value through the connector 60 to an external device.

The connector 60 may have a housing 61 having a square tubular shape, and a plurality of male terminals 62 housed in the housing 61. The connector 60 may be disposed on the upper surface 13*e* of the protruding portion 13. The connector 60 may be connected to an external device, such as an electronic control unit (ECU) mounted on an automobile, through a cable having a counterpart connector that is mated with the connector 60.

The load detecting device 1 may be supplied with power from the external device and transmits a signal showing a load detected by the load sensor 10 to the external device.

Next, the working of the above-described load detecting device 1 will be described.

As shown in FIG. 3, the above-described load detecting device 1 may be formed such that the center point 18*p* of the seat mounting hole 18 of the load sensor 10 is offset from the center point 12*p* of the main body portion 12 (that is, the center point of the arrangement of the elements 21 to 28) toward the protruding portion 13 (in the Y2 direction) by a distance L1.

The reference load detecting device 1S shown in FIGS. 5A to 5C has the same configuration as the load detecting device 1 except that it has a load sensor 10 formed such that the center point 18*p* of the seat mounting hole 18 coincides with the center point 12*p* of the main body portion 12.

The offset load characteristic in the reference load detecting device 1S was obtained. Specifically, a mounting bolt 81 was attached to the reference load detecting device 1S, and the reference load value when a constant load F in the Z2 direction is applied to the mounting bolt 81 was detected. Next, one end of a rod-like offset load member having a predetermined length extending in the horizontal direction was attached to the distal end of the mounting bolt 81, and the offset load value when a constant load F in the Z2 direction is applied to the other end of the offset load member was detected in all directions (at approximately 45 degree intervals in this embodiment). The offset load characteristic, which is the rate of change of the offset load value with respect to the reference load value, was calculated in each direction, and the result of this calculation is shown by dashed line in FIG. 6B.

The offset load characteristic in the load detecting device 1 of this embodiment described above was obtained in the same manner. The offset load characteristic in the load detecting device 1 is shown by solid line in FIG. 6B.

The offset load characteristics in the reference load detecting device 1S and the load detecting device 1 were obtained by simulation.

It can be seen that, as shown by dashed line in FIG. 6B, the offset load characteristic in the reference load detecting device 1S is small at 0°, is large at 180°, and the difference (variation) in offset load characteristic between 0° and 180° is large. The reason for this is assumed to be that because the protruding portion 13 is located in 0° direction with respect to the center point 12*p* of the main body portion 12, the rigidity of the main body portion 12 in 0° direction is relatively high, and the rigidity of the main body portion 12 in the opposite direction (180° direction) is relatively low.

It can be seen that, as shown by solid line in FIG. 6B, the difference in the offset load characteristic of the load detecting device 1 between 0° and 180° is small compared to the reference load detecting device 1S. The reason for this is assumed to be that, by offsetting the center point 18*p* of the seat mounting hole 18 toward the protruding portion 13, the rigidity in 0° direction is decreased, the rigidity in the opposite direction (180° direction) is increased, and the balance of rigidity around the center point 18*p* of the seat mounting hole 18 is improved compared to the reference load detecting device 1S.

As described above, in a configuration in which, in plan view of the load receiving member 11, the center point 18*p* of the seat mounting hole 18 coincides with the center point 12*p* of the main body portion 12 (that is, the center point of the arrangement of the plurality of strain detecting elements 21 to 28), the offset load characteristic in a direction passing through a part of the load receiving member 11 that has relatively high rigidity is small. In the above-described load detecting device 1, in plan view of the load receiving member 11, the center point 18*p* of the seat mounting hole 18 is offset from the center point 12*p* of the main body portion 12 toward a part of the load receiving member 11 that has relatively high rigidity, the balance of rigidity around the seat mounting hole 18 is thereby improved, and the offset load characteristic in a direction toward that part can be made relatively small. Therefore, the variation in offset load characteristic can be suppressed.

Figure 7A:
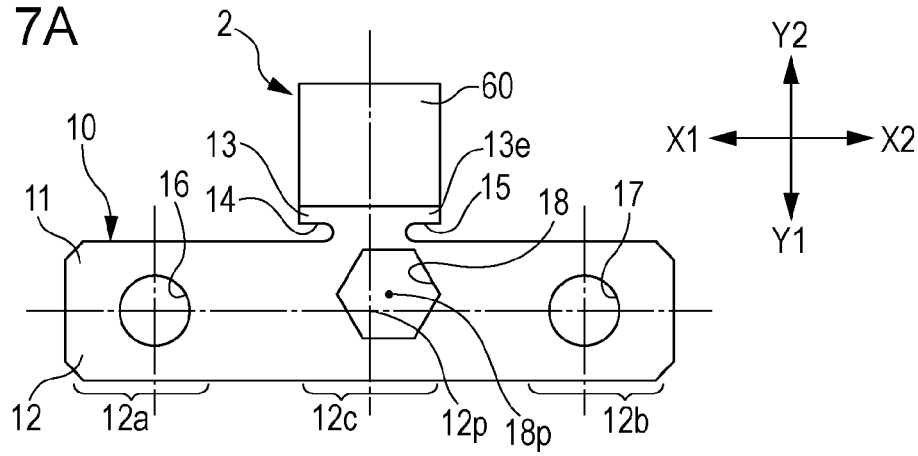
FIGS. 7A to 7C illustrate the configuration of a load detecting device according to an example embodiment of the present disclosure.
Figure 7B:
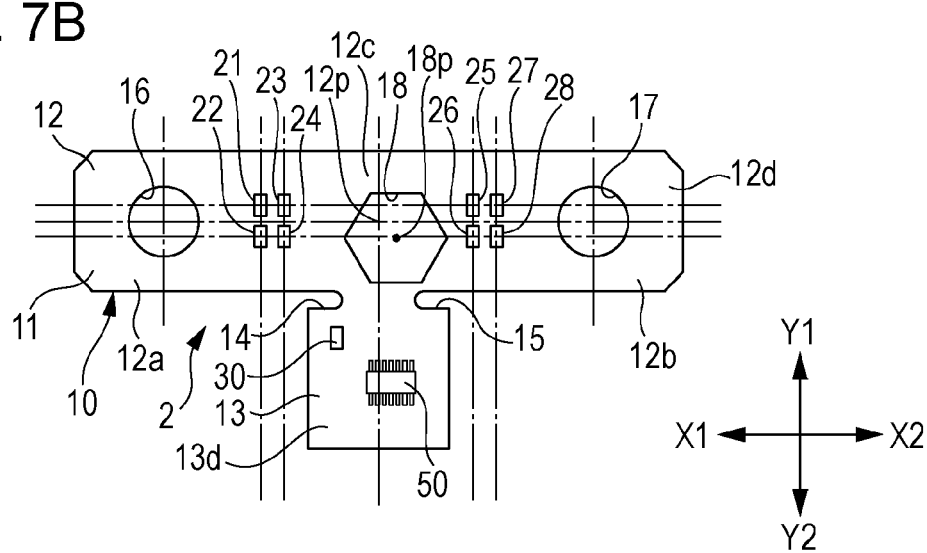
Figure 7C:
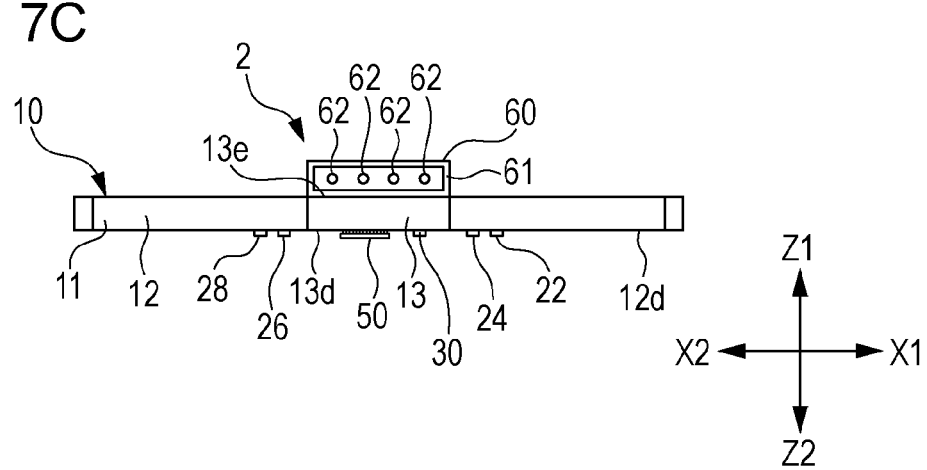
Figure 8:
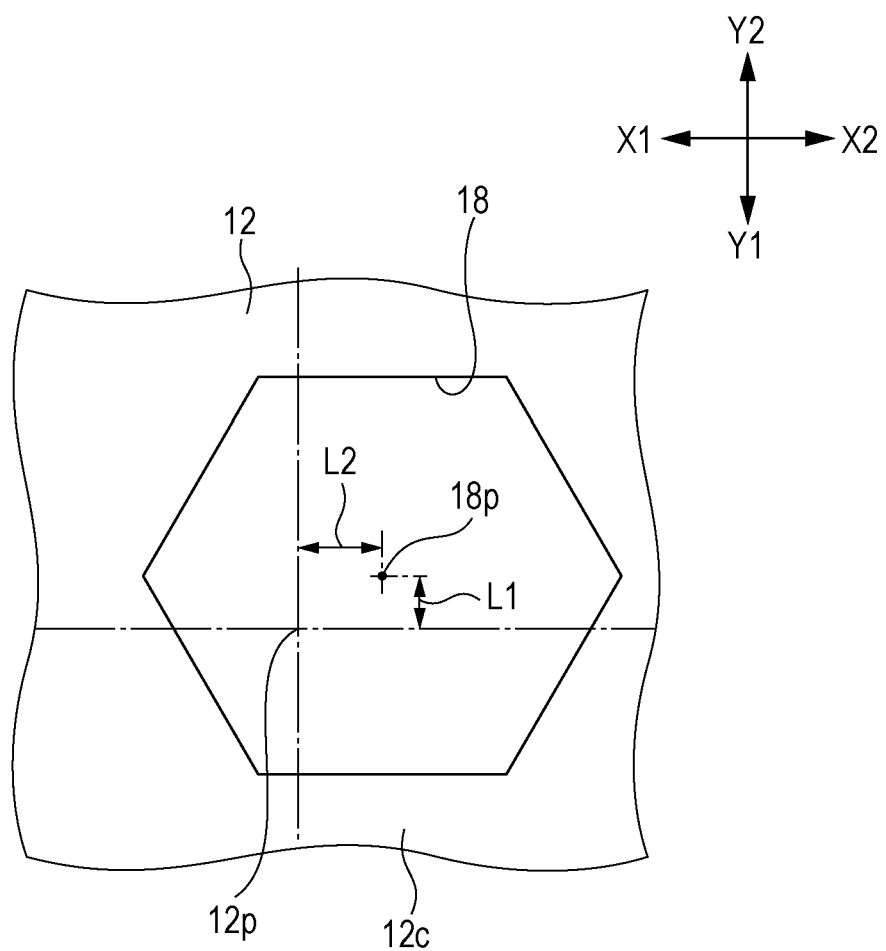
FIG. 8 is an enlarged plan view illustrating the offset of a seat mounting hole provided in a load sensor of the load detecting device of FIGS. 7A to 7C.
Figure 9:
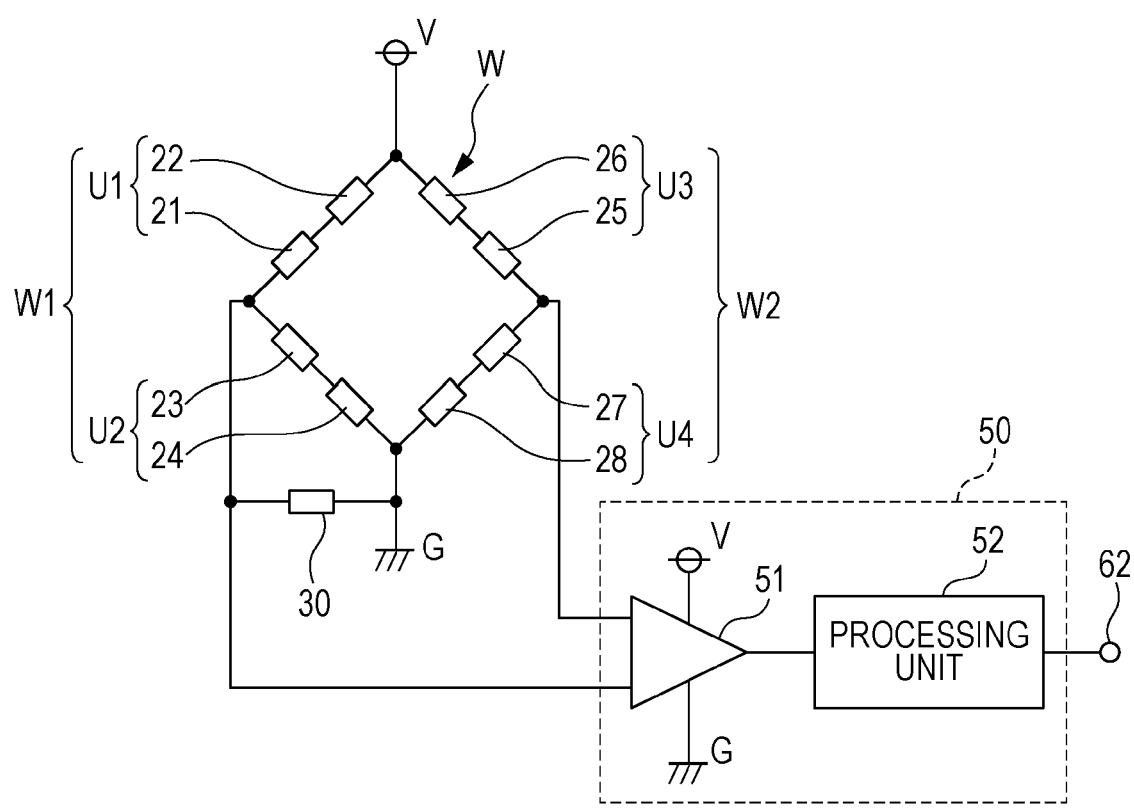
FIG. 9 illustrates the circuit configuration of the load sensor of the load detecting device of FIGS. 7A to 7C.
Figure 10A:
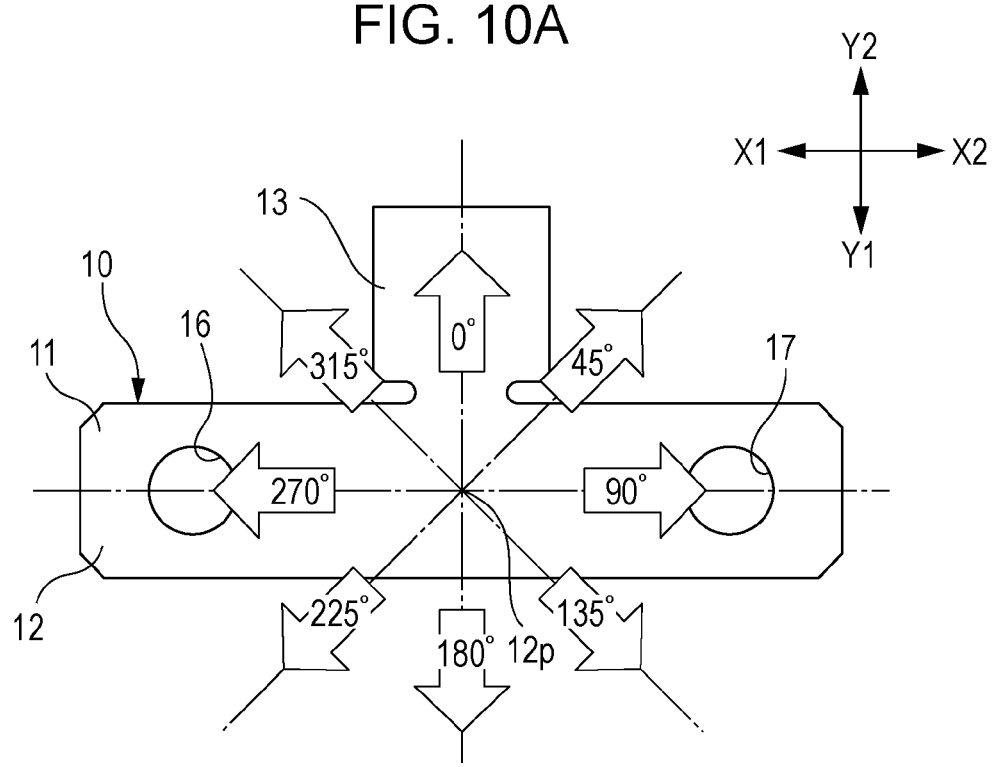
FIGS. 10A and 10B illustrate the offset load characteristic of the load detecting device of FIGS. 7A to 7C.
Figure 10B:
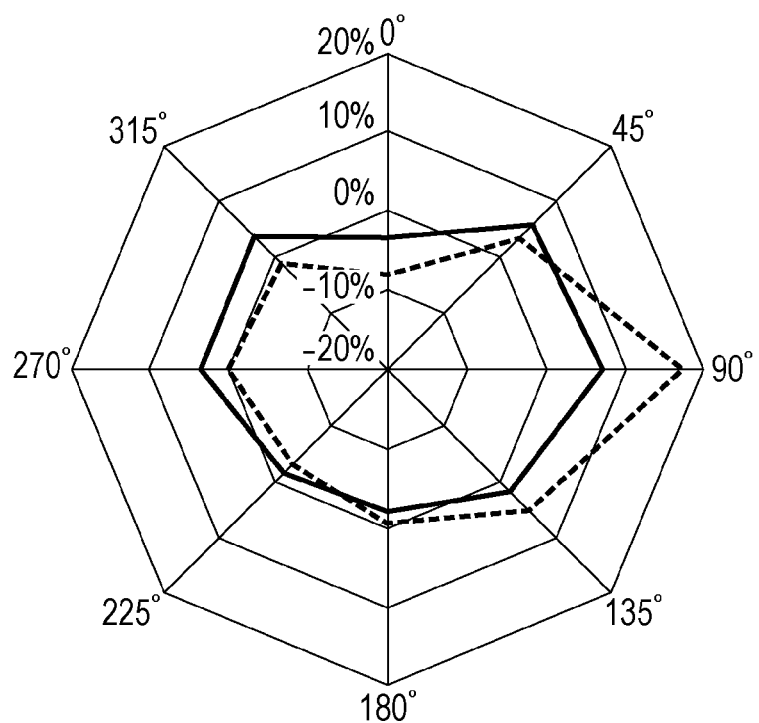

FIGS. 7A to 7C illustrate the configuration of the load detecting device according to an example embodiment of the present disclosure. FIG. 7A is a plan view, FIG. 7B is a bottom view, and FIG. 7C is a back view. FIG. 8 is an enlarged plan view illustrating the offset of a seat mounting hole provided in a load sensor of the load detecting device of FIGS. 7A to 7C. FIG. 9 illustrates the circuit configuration of the load sensor of the load detecting device of FIGS. 7A to 7C. FIGS. 10A and 10B illustrate the offset load characteristic of the load detecting device of FIGS. 7A to 7C. FIG. 10A is a plan view illustrating the directions of the offset load. FIG. 10B is a graph showing an example of the offset load characteristic in each direction of the offset load.

In the description of the load detecting device 2, the same reference signs will be used to designate components having the same configurations and functions as those in the load detecting device of the example embodiment described above, and the description thereof is omitted.

In each figure, the X1-X2 direction and the Y1-Y2 direction show two directions perpendicular to each other in a plane, and the Z1-Z2 direction shows a direction perpendicular to the plane. The plane containing the X1-X2 direction and the Y1-Y2 direction is a horizontal plane, and the Z1-Z2 direction is a vertical direction.

As with the load detecting device 1 described above, the load detecting device 2 in this embodiment may be provided between a seat of an automobile and a slide body slidably provided on a slide rail extending in the front-back direction of the automobile, and may be used for detecting the presence or absence of an occupant in the seat and the weight of the occupant.

As shown in FIGS. 7A to 7C, the load detecting device 2 may have a configuration that is different from that of the load detecting device 1 in the following respects (i) to (iii), but in other respects, the configuration of the load detecting device 2 may be the same as that of the load detecting device 1.

(i) A plurality of strain detecting elements (hereinafter simply referred to as "elements") 21 to 28 may be set such that when no load is applied to a main body portion 12, the resistance values R1, R2, and R5 to R8 of the elements 21, 22, and 25 to 28 are equal to each other, and the elements 21, 22, and 25 to 28 are equal in the amount of change in resistance value with respect to the amount of strain of the main body portion 12. The elements 21 to 28 also may be set such that the resistance values R3 and R4 of the elements 23 and 24 are equal to each other and higher than the resistance value R1, and the elements 23 and 24 are equal in the amount of change in resistance value with respect to the amount of strain of the main body portion 12.

(ii) As shown in FIG. 9, an adjusting resistor 30 may be provided in parallel with a resistance unit U2 (elements 23 and 24). The adjusting resistor 30 may be disposed on the lower surface 13d of the protruding portion 13.

(iii) As shown in FIG. 8, the seat mounting hole 18 may be formed such that its center point 18p is located at a position offset from the center point 12p of the main body portion 12 by a distance L1 in the Y2 direction and by a distance L2 in the X2 direction.

Even if the resistance units U1 to U4 (that is, the elements 21 to 28) forming a Wheatstone bridge circuit W may be formed in the same manner, they may vary in electrical characteristic (resistance value in the absence of strain), and the Wheatstone bridge circuit W may not be in equilibrium in an unloaded state where no load is applied to a load receiving member 11.

So, one of the resistance units U1 to U4 (the resistance unit U2) may be formed such that its resistance value in the unloaded state is higher than those of the other resistance units (U1, U3, and U4), and the adjusting resistor 30 may be provided in parallel with the resistance unit U2 having a high resistance value. By irradiating the adjusting resistor 30 with laser to adjust its resistance value, the Wheatstone bridge circuit W can be brought into equilibrium relatively easily in an unloaded state. However, in such a configuration, the resistance units U1, U3, and U4 may differ from the resistance unit U2 in electrical characteristic in response to a load (sensitivity to strain).

The above-described load detecting device 2 may be formed such that the center point 18p of the seat mounting hole 18 of the load sensor 10 is offset from the center point 12p of the main body portion 12 (that is, the center point of the arrangement of the elements 21 to 28) by a distance L1 toward the protruding portion 13 (in the Y2 direction) and by a distance L2 toward the slide body mounting hole 17 (in the X2 direction).

The reference load detecting device 2S (not shown), which has the same configuration as the reference load detecting device 1S shown in FIGS. 5A to 5C except for the adjusting resistor 30, may have the same configuration as the load detecting device 2 except that it has a load sensor 10 formed such that the center point 18p of the seat mounting hole 18 coincides with the center point 12p of the main body portion 12.

The offset load characteristic in the reference load detecting device 2S was obtained. Specifically, a mounting bolt 81 was attached to the reference load detecting device 2S, and the reference load value when a constant load F in the Z2 direction is applied to the mounting bolt 81 was detected. Next, one end of a rod-like offset load member having a predetermined length extending in the horizontal direction was attached to the distal end of the mounting bolt 81, and the offset load value when a constant load F in the Z2 direction is applied to the other end of the offset load member was detected in all directions (at approximately 45 degree intervals in this embodiment). The offset load characteristic, which is the rate of change of the offset load value with respect to the reference load value, was calculated in each direction, and the result of this calculation is shown by dashed line in FIG. 10B.

The offset load characteristic in the load detecting device 2 of this embodiment described above was obtained in the same manner. The offset load characteristic in the load detecting device 2 is shown by solid line in FIG. 10B.

The offset load characteristics in the reference load detecting device 2S and the load detecting device 2 were obtained by simulation.

It can be seen that, as shown by dashed line in FIG. 10B, the offset load characteristic in the reference load detecting device 2S is small at 0°, is large at 90°, and the difference (variation) in offset load characteristic between 0° and 90° is large. The reason for this is assumed to be that because the protruding portion 13 is located in 0° direction with respect to the center point 12p of the main body portion 12, the rigidity of the main body portion 12 in 0° direction is relatively high, and the sensitivity to strain of the second circuit part W2 (resistance units U3 and U4) forming the Wheatstone bridge circuit W is higher than that of the first circuit part W1 (resistance units U1 and U2).

It can be seen that, as shown by solid line in FIG. 10B, the difference in the offset load characteristic of the load detecting device 2 between 0° and 90° is small compared to the reference load detecting device 2S. The reason for this is assumed to be that, by offsetting the center point 18p of the seat mounting hole 18 toward the protruding portion 13 and toward the slide body mounting hole 17, the rigidity in 0° direction is decreased, the sensitivity in 90° direction is decreased, and the balance of rigidity and strain sensitivity around the center point 18p of the seat mounting hole 18 is improved compared to the reference load detecting device 2S.

As described above, in a configuration in which, in plan view of the load receiving member 11, the center point 18p of the seat mounting hole 18 coincides with the center point 12p of the main body portion 12 (that is, the center point of the arrangement of the plurality of strain detecting elements 21 to 28), when a Wheatstone bridge circuit W is disposed on the load receiving member 11, the variation in offset load characteristic may be large depending on the asymmetry of electrical characteristic of the circuit W. Specifically, when the ratio of the resistance value of the positive-side resistance unit U1 to the resistance value of the negative-side resistance unit U2 in the first circuit part W1 of the Wheatstone bridge circuit W is set smaller than the ratio of the resistance value of the positive-side resistance unit U3 to the resistance value of the negative-side resistance unit U4 in the second circuit part W2 of the Wheatstone bridge circuit W, due to the difference in sensitivity to strain between the first circuit part W1 and the second circuit part W2, the offset load characteristic in a direction toward the second circuit part W2 (90° direction) is relatively large. In the above-described load detecting device 2, in plan view of the load receiving member 11, the center point 18p of the seat mounting hole 18 is offset from the center point 12p of the main body portion 12 toward the second circuit part W2, the balance of sensitivity to strain of each of the circuit parts W1 and W2 is thereby improved, and the offset load characteristic in a direction toward the second circuit part W2 can be made relatively small. Therefore, the variation in offset load characteristic can be suppressed.

In the load sensor 10 of the load detecting device 2, in plan view of the load receiving member 11, the center point 18p of the seat mounting hole 18 is also offset from the center point 12p of the main body portion 12 toward a part of the load receiving member 11 that has relatively high rigidity (protruding portion 13). By offsetting the center point 18p of the seat mounting hole 18 from the center point 12p of the main body portion 12 toward a part of the load receiving member 11 that has relatively high rigidity (protruding portion 13), the balance of rigidity around the seat mounting hole 18 is improved, and the offset load characteristic in a direction toward the protruding portion 13 can be decreased. Therefore, the variation in offset load characteristic can be further suppressed.

Although example embodiments of the present disclosure have been described, the present invention is not limited to the configurations of the above-described embodiments.

In the above-described embodiments, the center point 18p of the seat mounting hole 18 is offset from the center point of the main body portion 12 of the load receiving member 11, and the center point of the arrangement of the plurality of strain detecting elements 21 to 28 is disposed so as to coincide with the center point of the main body portion 12 of the load receiving member 11. However, the present invention is not limited to this. Conversely, the center point 18p of the seat mounting hole 18 may be disposed so as to coincide with the center point of the main body portion 12 of the load receiving member 11, and the center point of the arrangement of the plurality of strain detecting elements 21 to 28 may be offset from the center point of the main body portion 12 of the load receiving member 11. Alternatively, the center point 18p of the seat mounting hole 18 and the center point of the arrangement of the plurality of strain detecting elements 21 to 28 may be both offset from the center point of the main body portion 12 of the load receiving member 11.

In the above-described embodiments, the load receiving member 11 may be formed in a substantially T-shape in plan view. However, the present invention is not limited to this. For example, the load receiving member may be composed only of a rectangular plate-like main body portion, or may be formed in a polygonal plate-like shape, such as a triangular plate-like shape, a hexagonal plate-like shape, or an octagonal plate-like shape, a circular plate-like shape, an elliptical plate-like shape, or an oval plate-like shape. The load receiving member may have any configuration without departing from the spirit of the present invention.

The above-described embodiments are merely illustrative embodiments of the present invention, and the present invention is not limited to the embodiments. In other words, those skilled in the art can make various modifications according to the known knowledge, without departing from the gist of the present invention. Of course, such modifications are included in the scope of the present invention as long as they have the configurations of the load sensor and load detecting device of the present invention.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A load sensor comprising:
   a plate-like load receiving member having side body mounting holes formed at respective sides of the plate-like load receiving member, a seat mounting hole formed at a center position between the side body mounting holes, a pair of supporting portions and a load receiving portion provided between the pair of supporting portions; and
   a plurality of strain detecting elements disposed around the load receiving portion, the resistance value of each of the respective plurality of strain detecting elements changing depending on the amount of strain of the load receiving member,
   wherein in plan view of the load receiving member, the center point of the load receiving portion is offset from the center point of the arrangement of the plurality of strain detecting elements toward a part of the load receiving member that has relatively high rigidity.

2. The load sensor according to claim 1,
   wherein the load receiving member is formed in a substantially T-shape in plan view, the substantially T-shape having a rectangular plate-like main body portion and a protruding portion protruding from the middle of a long side of the main body portion in a direction perpendicular to the long side,
   the pair of supporting portions are provided in both longitudinal end parts of the main body portion, and
   in plan view of the load receiving member, the center point of the load receiving portion is offset from the center point of the arrangement of the plurality of strain detecting elements toward the protruding portion.

3. The load sensor according to claim 1, wherein the plurality of strain detecting elements are disposed symmetrically with respect to a line passing through the center point of the arrangement and parallel to a direction in which the pair of supporting portions are opposed to each other.

4. The load sensor according to claim 1, wherein the plurality of strain detecting elements are disposed symmetrically with respect to a line passing through the center point of the arrangement and perpendicular to a direction in which the pair of supporting portions are opposed to each other.

5. The load sensor according to claim 3, wherein the plurality of strain detecting elements are disposed symmetrically with respect to a line passing through the center point of the arrangement and perpendicular to a direction in which the pair of supporting portions are opposed to each other.

6. A load sensor comprising:
- a plate-like load receiving member having side body mounting holes formed at respective sides of the plate-like load receiving member, a seat mounting hole formed at a center position between the side body mounting holes, a pair of supporting portions and a load receiving portion provided between the pair of supporting portions; and
- a plurality of strain detecting elements disposed around the load receiving portion, the resistance value of each of the respective plurality of strain detecting elements changing depending on the amount of strain of the load receiving member,
- wherein the plurality of strain detecting elements form four resistance units, and a first circuit part in which two of the four resistance units are connected in series and a second circuit part in which the other two of the four resistance units are connected in series are connected in parallel to form a Wheatstone bridge circuit,
- the first circuit part is disposed between one of the pair of supporting portions and the load receiving portion,
- the second circuit part is disposed between the other of the pair of supporting portions and the load receiving portion,
- in a state where no load is applied to the load receiving member, the ratio of the resistance value of the positive-side resistance unit to the resistance value of the negative-side resistance unit in the first circuit part is set smaller than the ratio of the resistance value of the positive-side resistance unit to the resistance value of the negative-side resistance unit in the second circuit part, and in plan view of the load receiving member, the center point of the load receiving portion is offset from the center point of the arrangement of the plurality of strain detecting elements toward the second circuit part.

7. The load sensor according to claim 6, wherein in plan view of the load receiving member, the center point of the load receiving portion is also offset from the center point of the arrangement of the plurality of strain detecting elements toward a part of the load receiving member that has relatively high rigidity.

8. The load sensor according to claim 6, wherein the plurality of strain detecting elements are disposed symmetrically with respect to a line passing through the center point of the arrangement and parallel to a direction in which the pair of supporting portions are opposed to each other.

9. The load sensor according to claim 6, wherein the plurality of strain detecting elements are disposed symmetrically with respect to a line passing through the center point of the arrangement and perpendicular to a direction in which the pair of supporting portions are opposed to each other.

10. The load sensor according to claim 8, wherein the plurality of strain detecting elements are disposed symmetrically with respect to a line passing through the center point of the arrangement and perpendicular to a direction in which the pair of supporting portions are opposed to each other.

11. A load detecting device comprising the load sensor according to claim 1 and a load detecting portion that detects the load applied to the load receiving member based on the output of the load sensor.

12. A load detecting device comprising the load sensor according to claim 6 and a load detecting portion that detects the load applied to the load receiving member based on the output of the load sensor.

* * * * *